3,629,444
ANTIDEPRESSANT COMPOSITIONS AND
METHOD OF TREATING
Povl V. Petersen, Virum, Niels Lassen, Gentofte, and Jes Hjortkjaer, Hvidovre, Denmark, assignors to Kefalas A/S, Copenhagen-Valby, Denmark
No Drawing. Continuation-in-part of application Ser. No. 622,035, Mar. 10, 1967. This application Jan. 15, 1970, Ser. No. 3,222
Claims priority, application Great Britain, Mar. 17, 1966, 11,870/66
Int. Cl. A61k 27/00
U.S. Cl. 424—285                                    20 Claims

ABSTRACT OF THE DISCLOSURE

Amino alkyl-substituted 3-cyano phthalanes and the corresponding acid addition salts thereof are prepared by reacting the corresponding amino-alkyl-substituted 3-hydroxy-phthalane with an alkali metal cyanide. Additional derivatives of these compounds are prepared by further conversion of the 3-cyano group of the compound. The prepared compounds are useful for the treatment of endogenous depressions in living animals and are administered as compositions comprising the active ingredient and a suitable pharmaceutical carrier.

CROSS-REFERENCE TO RELATED APPLICATIONS

This application is a continuation-in-part of U.S. Ser. No. 662,035 filed on Mar. 10, 1967 now U.S. Patent 3,523,124.

SUMMARY OF THE INVENTION

The present invention relates to compositions containing compounds of the following general formula:

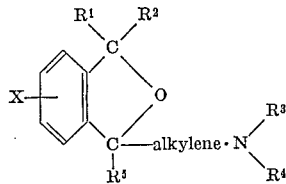

wherein $R^1$ and $R^2$ each represents hydrogen, a lower-alkyl group or phenyl, $R^3$ and $R^4$ represent hydrogen, lower-alkyl, or benzyl, "alkylene" represents a straight or branched alkylene chain having 2–6 C-atoms, at least two carbon atoms being in the chain directly connecting the ring carbon atom with the nitrogen atom, X is a five (5) position substitutent which can be hydrogen, halogen, lower-alkyl, lower-alkyloxy or trihalomethyl, and $R^5$ can be one of the groups —CN, —CHO, —C=N·OH, —COOH, —CH$_2$·NH$_2$, —CO·NHR$^6$, —COOR$^7$,

—CO·R$^8$ and —CHOH·R$^8$, wherein $R^6$ represents hydrogen, lower-alkyl or phenyl, $R^7$ represents lower-alkyl, $R^8$ represents lower-alkyl, phenyl or phenyl-lower-alkyl, as well as the acid addition salts thereof with phramaceutically acceptable acids.

It is an object of the present invention to provide novel compounds of Formula I, methods of making the same, a method for the alleviation, palliation, mitigation, or inhibition of the manifestations of certain physiological-psychological abnormalities of animals therewith, and pharmaceutical compositions comprising such novel compounds as active ingredient. Other objects will be apparent to one skilled in the art and still other objects will become apparent hereinafter.

The compounds of Formula I and the acid addition salts thereof are useful therapeutics and possess valuable pharmacodynamic properties. In animal experiments the compounds show a very pronounced potentiating effect on adrenaline and nor-adrenaline and also a very strong antireserpine effect. They moreover have relatively weak sedative and anticholinergic effects. These effects together with the relatively low toxicity of these compounds constitute a characteristic pharmacologic profile of antidepressants of the thymoleptic type and make the compounds of Formula I as well as their acid addition salts very useful in psychotherapy, especially in the treatment of endogenous depressions.

The compounds of Formula I and the phramaceutically acceptable acid addition salts thereof may be administered both orally and parenterally, for example in the form of tablets, capsules, powders, syrups or solutions for injection.

DESCRIPTION OF THE PREFERRED EMBODIMENTS

Compounds of Formula I are prepared by reacting a compound of the following formula:

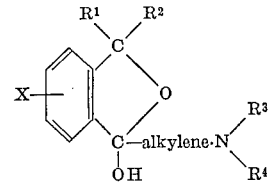

wherein X, $R^1$, $R^2$, $R^3$, and $R^4$ are as defined above, and "alkylene" represents an alkylene chain having from 3–6 C-atoms inclusive, at least three C-atoms being in the chain directly connecting the ring carbon atom with the nitrogen atom with an alkali metal cyanide in the presence of a mineral acid or an organic acid, whereupon the resulting compound of the formula:

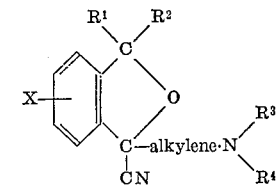

is isolated as the free amine or as an acid addition salt with a pharmaceutically acceptable acid in conventional manner, and, if desired, reacting the cyano-compound with (a) a Grignard compound selected from phenyl-magnesium halides, lower-alkylmagnesium halides and phenyl-lower alkyl-magnesiumhalides and subsequently hydrolyzing the thus formed Grignard complex in conventional manner in order to obtain compounds of Formula I wherein $R^5$ is —CO·R$^8$ and, if desired, reducing the —CO·R$^8$ group to —CHOH·R$^8$ in conventional manner, or (b) converting the —CN group to either —COOH, —CHO, —CO·NH$_2$ or —CH$_2$·NH$_2$ in well-known manner and if desired esterifying the —COOH group in conventional manner in order to obtain compounds of Formula I wherein $R^5$ is —COOR$^7$, or converting the —CHO-group to —C·NOH with hydroxylamine in conventional manner, or if desired converting the ester group —COOR$^7$ to the group —CO·NHR$^6$ in conventional manner, and isolating the thus obtained compounds of Formula I as the free amine or as an acid addition salt with a pharmaceutically acceptable acid.

When compounds of Formula I wherein $R^3$ is hydrogen and $R^4$ is a lower-alkyl group are desired they may conveniently be prepared from the compounds of Formula I where $R^3$ and $R^4$ each is a lower-alkyl group by reacting such a compound with a chloroformic acid ester of the formula Cl·COOR⁹, wherein R⁹ represents a lower-alkyl group or a benzyl group, hydrolyzing the resulting compound of the formula:

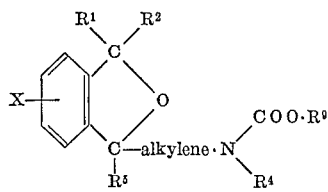

and isolating the compound of Formula I, wherein $R^3$ is hydrogen and $R^4$ is a lower-alkyl group as the free amine or in the form of an acid addition salt with a pharmaceutically acceptable acid. In certain cases, however, for example when $R^5$ is —CN or —COO·R⁷, the desired mono-alkyl-amino compounds may more conveniently be prepared from the compounds wherein $R^3$ is a benzyl group and $R^4$ is a lower-alkyl group by a simple hydrogenolysis which readily removes the benzyl group.

The Grignard-reaction is carried out in conventional manner in an anhydrous medium such as diethyl ether, tetrahydrofuran or the like and the subsequent hydrolysis carried out in an acid or faintly acid medium.

The conversion of the —CN group to —COOH or —CO·NH₂ takes normally the shape of an ordinary hydrolysis. When hydrolysis to —COOH is desired it is preferably a hydrolysis under alkaline conditions and if a conversion to —CO·NH₂ is desired it is preferably an acid hydrolysis.

The reduction of the group —CN to —CHO or

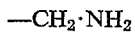

is preferably carried out with lithium aluminum hydride as the reducing agent in an anhydrous inert solvent such as diethyl ether or the like, and the amount of reducing agent and reaction conditions selected so that the desired degree of reduction is attained.

When compounds of Formula I wherein $R^5$ is

are desired they may according to the invention be prepared in conventional manner by reaction of the ester group —COOR⁷ with an amine H₂N·R⁶. When R⁶ is phenyl they may conveniently be prepared by reaction of the ester group with an aniline magnesium halide.

The acid addition salts of the novel compounds of Formula I are preferably salts of pharmacologically acceptable non-toxic acids such as mineral acids, for example, hydrochloric acid, hydrobromic acid, phosphoric acid, sulphuric acid, and the like, and organic acids such as acetic acid tartaric acid, maleic acid, citric acid, methane sulphuric acid and the like.

In the foregoing Formula I and elsewhere herein, the terms lower-alkyl and lower-alkyloxy refer to alkyl or alkyloxy radicals containing up to and including eight carbon atoms, and preferably no more than three carbon atoms, which radicals may have either straight or branched chain structure, for example methyl, ethyl, propyl, isopropyl, butyl, isobutyl, amyl, hexyl, heptyl, octyl, methoxy, ethoxy, propoxy, butoxy, amyloxy, hexoxy, heptoxy, or the like.

The starting carbinols of Formula II may conveniently be prepared by reacting a compound of the following formula:

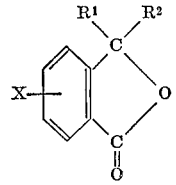

wherein X, $R^1$ and $R^2$ are as defined above, with a compound of the formula:

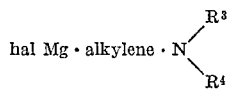

wherein $R^3$ and $R^4$ together with the nitrogen atom forms a tertiary amine according to the definition given above, "alkylene" is as defined above and "hal" represents a halogen atom, and hydrolyzing the reaction mixture in conventional manner, and isolating the resulting compound of Formula II.

Of the compounds of Formula I especially those where $R^5$ is —CN, $R^3$ and $R^4$ are hydrogen or lower-alkyl groups, X is hydrogen, and $R^1$ and $R^2$ are methyl groups have shown to be very active in the pharmacological testing, and particularly the compound 1,1-dimethyl-3-(3-methylaminopropyl) - 3 - cyanophthalane has shown outstanding properties in the pharmacological tests.

It may sometimes be convenient to change the sequence of reaction steps when preparing compound of Formula I wherein $R^5$ is —CN, according to the following reaction scheme:

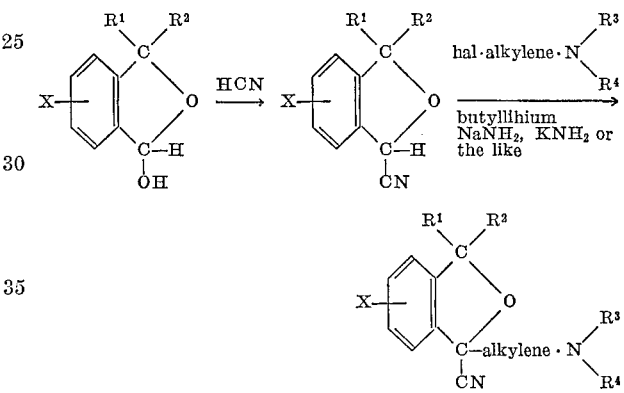

wherein X, $R^1$, $R^2$, $R^3$ and $R^4$ are as defined above and "alkylene" is a straight or branched alkylene chain having from 2–6 C-atoms, at least 2 C-atoms being in the chain directly connecting the ring carbon atom with the nitrogen atom, and "hal" represents a halogen atom, preferably chlorine, bromine or iodine. The condensation may conveniently be carried out in an inert solvent and as condensing agent may be used such as are conventionally used in this type of condensation, for example butyllithium, phenyllithium, sodamide, potassium amide or the like. Also this method forms part of the present invention.

The following examples are given by way of illustration only and are not to be construed as limiting.

Example 1.—1,1-dimethyl-3-(3-dimethylaminopropyl)-3-cyano-phthalane and its hydrochloride To 1,1-dimethyl - 3 - (3-dimethylaminopropyl)-3-hydroxy-phthalane (125 grams, 0.5 mole) were added 35 grams (0.7 mole) of sodium-cyanide. Then 245 grams of 40% sulphuric acid were added dropwise while stirring at a temperature about zero degrees centigrade. After the addition was completed the reaction mixture was stirred for two hours at zero degrees centigrade, whereupon the mixture was refluxed for one hour and finally the excess of hydrogencyanide removed in vacuo.

The reaction mixture was then made alkaline with a concentrated aqueous solution of sodium hydroxide and extracted with ether. The ether phase was dried over anhydrous sodium sulphate, filtered and the ether removed on a steam bath. The residue was distilled in vacuo and the fraction boiling at 140–142 degrees centigrade/1 mm. Hg was collected. Yield 107 grams. 83% of 1,1-dimethyl-3-(3-dimethylaminopropyl)-3-cyano-phthalane.

26 grams of this base were dissolved in hot acetone and the solution was made acid with dry hydrogen chloride. Upon cooling 28 grams of the hydrochloride of 1,1-dimethyl - 3 - (3-dimethylaminopropyl)-3-cyano-phthalane crystallized out melting at 163–165 degrees centigrade.

Example 2.—1,1-dimethyl-3-(3-dimethylaminopropyl)-3-propionyl-phthalane and its hydrochloride To a solution of 0.15 mole of ethylmagnesium-bromide in ether prepared in conventional manner was added dropwise a solution of 26 grams (0.1 mole) of 1,1-dimethyl-(3-dimethylaminopropyl)-3-cyanophthalane in ether. After the addition had been completed the reaction mixture was refluxed for 30 minutes, whereupon the reaction mixture was poured into warm 2 N-hydrochloric acid. The acid solution was made alkaline with aqueous ammonia solution and the oil which separates out taken over in ether, the ether phase dried over anhydrous sodium sulphate, filtered and the ether removed on a steam bath. The residue was dissolved in warm acetone and the solution made slightly acid with dry hydrogen-chloride. Upon cooling the hydrochloride of 1,1-dimethyl - 3 - (3-dimethylaminopropyl)-3-propionyl-phthalane crystallized out. Yield 27 grams (83%). M.P. 191–192 degrees centigrade.

Example 3.—1,1-dimethyl-3-(3-dimethylaminopropyl)-3-acetyl-phthalane, and its hydrochloride When Example 2 was carried out using methylmagnesium iodide instead of ethyl magnesium bromide the hydrochloride of 1,1 - dimethyl-3-(3-dimethylaminopropyl)-3-acetyl-phthalane was obtained as a white crystalline substance melting at 154–155 degrees centigrade. Yield 25 grams (80%).

Example 4.—1,1-dimethyl-3-(3-dimethylaminopropyl)-3-(α-hydroxyethyl)-phthalane and its hydrochloride To a solution of 4 grams of lithium aluminum hydride in ether was added dropwise a solution of 27.5 grams (0.1 mole) of 1,1 - dimethyl - 3-(3-dimethylaminopropyl)-3-acetyl-phthalane in ether. After reflux for 30 minutes the reaction mixture was hydrolyzed with water and the ether phase separated, dried over anhydrous sodium sulphate, filtered and evaporated on a steam bath. The residue was dissolved in warm acetone and the solution made slightly acid with dry hydrogen chloride. Upon cooling the hydrochloride of 1,1-dimethyl-3-(3-dimethylaminopropyl)-3-(α-hydroxyethyl)-phthalane was obtained as a white crystalline substance melting at 175–176 degrees centigrade. Yield 21 grams (67).

Example 5.—1,1-dimethyl-3-(3-dimethylaminopropyl)-3-benzoyl-phthalane and its hydrochloride When Example 2 was carried out using the equivalent amount of phenylmagnesium bromide instead of ethylmagnesiumbromide the hydrochloride of 1,1-dimethyl-3-(3 - dimethylaminopropyl)-3-benzoyl-phthalane was obtained as a white crystalline substance melting at 184–185 degrees centigrade. Yield 35 grams (94%).

Example 6.—1,1-dimethyl-3-(3-dimethylaminopropyl)-phthalane-carboxamide-3 and its hydrochloride 26 grams (0.1 mole) of 1,1-dimethyl-3-(3-dimethylaminopropyl)-3-cyano-phthalane were boiled for 2 hours in ethanol saturated with hydrogen chloride. Then the ethanol was evaporated and the residue dissolved in water. The aqueous solution was made alkaline with sodium hydroxide and extracted with ether. Upon cooling 1,1-dimethyl - 3 - (3-dimethylaminopropyl)-phthalane-carboxamide-3 crystallized out as a white crystalline substance melting at 120 degrees centigrade. Yield 23 grams (83%).

13 grams of this base were dissolved in boiling ethanol and the solution made slightly acid with dry hydrogen chloride. Upon cooling the hydrochloride of 1,1-dimethyl-3 - (3 - dimethylaminopropyl) - phthalane-carboxamide-3 crystallized out as a white crystalline substance melting at 226–227 degrees centigrade. Yield 12 grams (77%).

Example 7.—1,1-dimethyl-3-(3-dimethylaminopropyl)-phthalane-carboxylic acid-(3)

129 grams (0.5 mole) of 1,1-dimethyl-3-(3-dimethylaminopropyl)-3-cyano-phthalane was refluxed for 72 hours in ethanol saturated with potassium hydroxide. Then the reaction mixture was made slightly acid with concentrated hydrochloric acid and evaporated in vacuo.

The residue was extracted with boiling ethanol. Upon cooling and addition of ether 1,1-dimethyl-3-(3-dimethylaminopropyl)-phthalane-carboxylic acid-3 crystallized out. After recrystallization from acetone it melts at 188–189 degrees centigrade. Yield 35 grams (25%).

Example 8.—1,1-dimethyl-3-(3-dimethylaminopropyl)-3-carbethoxy-phthalane and its hydrochlorine 14 grams (0.05 mole) of 1,1-dimethyl-3-(3-dimethylaminopropyl)-phthalane-carboxylic acid-3 were dissolved in ethanol and the solution saturated with hydrogen chloride and refluxed for 30 minutes. The reaction mixture was poured into ice water, sodium hydroxide solution added to alkaline reaction and the oil which separated out taken over in ether. The ether solution was dried over sodium sulphate, filtered and evaporated on a steam bath. The residue was dissolved in boiling acetone and the solution made slightly acid with hydrogen chloride. Upon cooling and addition of ether the hydrochloride of 1,1-dimethyl - 3 - (3-dimethylaminopropyl)-3-carbethoxy-phthalane crystallized as a white substance melting at 153–155 dgerees centigrade. Yield 12 grams (70%).

Example 9.—1,1-dimethyl-3-(3-methylaminopropyl)-3-acetyl-phthalane and its hydrochloride 92 grams of 1,1-dimethyl-3-(3-dimethylaminopropyl)-3-acetyl-phthalane were dissolved in 600 milliliters of dry benzene and the solution added dropwise to 110 grams of ethyl-chloroformate keeping the temperature below 40 degrees centigrade. After the addition was completed the reaction mixture was heated unto 50 degrees centigrade while stirring vigorously for 1 hour. The reaction mixture was washed with 500 milliliters of 2 N-hydrochloric acid and evaporated in vacuum on a steam bath. The residue was then refluxed for 20 hours in a solution of 60 grams of potassium hydroxide in 60 milliliters of water and 450 milliliters of diethyleneglycolmonoethylether. After cooling the reaction mixture was poured into 1.5 liters of water. The mixture was extracted with ether, the ether phase dried over sodium sulphate, filtered and evaporated. The residue was dissolved in boiling acetone and the solution made slightly acid with hydrogen chloride. Upon cooling the hydrochloride of 1,1-dimethyl-3-(3-methylaminopropyl)-3-acetyl-phthalane separated out as a white crystalline substance melting at 159–160 degrees centigrade. Yield 44 grams (44%).

Example 10.—1,1-dimethyl-3-(2-dimethylaminoethyl)-3-cyano-phthalane 16 grams of 1,1-dimethyl-3-hydroxy-phthalane were dissolved in 400 milliliters of glacial acetic acid. While cooling and stirring 12.5 grams of sodium cyanide dissolved in the least possible amount of water were added dropwise at 0–5 degrees centigrade, whereupon the mixture was stirred for 2 hours at room temperature and finally for 2 hours at 50 degrees centigrade. Excess of hydrogen cyanide was evaporated in vacuum, whereupon the mixture was poured into ice water. The precipitate was filtered off and recrystallized from benzene resulting in 8 grams of 1,1-dimethyl-3-cyano-phthalane melting at 55–58 degrees centigrade.

To a solution of butyllithium in 40 milliliters of ether prepared from 8 grams of butylbromide was added dropwise while stirring a solution of 8 grams of 1,1-dimethyl-3-cyano-phthalane at minus 20 degrees centigrade. The temperature was allowed to rise to minus 5 degrees centigrade, and kept there for 1 minute and then cooled again to minus 20 degrees centigrade. Then a solution of 6 grams of 2-dimethylaminoethylchloride in 20 milliliters of ether was added dropwise while cooling and stirring at minus 20 to minus 10 degrees centigrade. The mixture was allowed to warm to room temperature and poured into ice water. The liberated base was extracted from the ether phase with dilute hydrochloric acid and precipitated from the acid solution by addition of aqueous ammonia. It was taken over in ether, the ether phase dried over anhydrous potassium carbonate, filtered and evaporated. Upon fractional distillation of the residue in vacuum 1,1 - dimethyl - 3-(2-dimethylaminoethyl)-3-cyano-phthalane was obtained as a colorless oil boiling at 140–145 degrees centigrade/0.2 mm. Hg.

Example 11.—1,1-dimethyl-3-(3-methyl-benzylaminopropyl)-3-cyano-phthalane and its hydrochloride To a solution of 3-methyl-benzylaminopropylmagnesiumchloride is 400 milliliters of dry tetrahydrofuran prepared from 50 grams of 3-methyl-benzylaminopropylchloride was added while stirring a solution of 40 grams of 3,3-dimethyl-phthalide in 200 milliliters of dry ether. Upon completed reaction the mixture was poured unto finely crushed ice, dilute hydrochloric acid was added to obtain solution of the magnesium hydroxide formed by the reaction, whereupon the ether phase was extracted with dilute hydrochloric acid. The combined acid extracts were washed with ether, whereupon the base was precipitated by addition of aqueous ammonia. It was extracted with ether, the ether phase dried over anhydrous potassium carbonate, filtered and evaporated. 32 grams of 1,1 - dimethyl - 3 - (3 - methyl-benzylaminopropyl)-phthalane-(3)-ol was obtained as a yellow oil.

The above-mentioned phthalanol was then treated as described in Example 1 with sodium cyanide and sulphuric acid and the hydrochloride of 1,1 - dimethyl-3-(3-methyl - benzylaminopropyl) - 3 - cyano - phthalane obtained by crystallization from acetone. M.P. 162–165 degrees centigrade.

Example 12.—1,1-dimethyl-3-(3-methylaminopropyl)-3-cyanophthalane and its hydrochloride 20 grams of the hydrochloride of 1,1-dimethyl-3-(3-methyl - benzylaminopropyl) - 3 - cyano - phthalane were dissolved in 250 milliliters of ethanol. 2 grams of 5% palladium on coal were added and the mixture reduced at room temperature at a hydrogen-pressure of 50 atmospheres until the pressure remains constant (about 3 hours). The catalyst was removed by filtration and the ethanol evaporated in vacuum. The residue was dissolved in 50 milliliters of acetone and cooled. 13 grams of the hydrochloride of 1,1 - dimethyl - 3 - (3 - methylaminopropyl) - 3 - cyano - phthalane crystallizes thereby as colorless crystals melting at 167–170 degrees centigrade.

Example 13.—1,1-dimethyl-3-(2-methylaminoethyl)-3-cyanophthalane and its hydrochloride When Example 12 was carried out using the equivalent amount of the hydrochloride of 1,1 - dimethyl - 3 - (2-methyl - benzylaminoethyl) - 3 - cyano - phthalane instead of the hydrochloride of 1,1-dimethyl-3-(3-methyl-benzylaminopropyl) - 3 - cyano - phthalane the hydrochloride of 1,1 - dimethyl - 3 - (2-methylaminoethyl)-3-cyano - phthalane was obtained as a white crystalline substance.

Example 14.—1-methyl-3-(3-dimethylaminopropyl)-3-cyano-phthalane and its hydrochloride When Example 1 was carried out using the equivalent amount of 1 - methyl - 3 - (3 - dimethylaminopropyl)-3-hydroxy-phthalane instead of 1,1 - dimethyl - 3 - (3-dimethyl - aminopropyl) - 3 - hydroxy - phthalane the hydrochloride of 1 - methyl - 3 - (3-dimethylaminopropyl)-3-cyano-phthalane was obtained as a white crystalline substance.

Example 15.—1-(3-dimethylaminopropyl)-1-cyanophthalane and its hydrochloride

When Example 1 was carried out using the equivalent amount of 1 - (3 - dimethylaminopropyl) - 1 - hydroxyphthalane instead of 1,1 - dimethyl - 3 - (3 - dimethylaminopropyl) - 3 - hydroxy - phthalane the hydrochloride of 1 - (3 - dimethylaminopropyl) - 1 - cyano-phthalane was obtained as colorless crystals.

Example 16.—1,1 - dimethyl - 3 - (3 - diethylaminopropyl) - 3 - cyano-phthalane, 1,1-dimethyl - 3 - (3-di-n-butylaminopropyl) - 3 - cyano - phthalane, and their hydrochlorides When Example 1 was carried out using equivalent amounts of the appropriately amino-substituted 1,1-dimethyl - 3 - hydroxyphthalanes respectively instead of 1,1 - dimethyl - 3 - (3-dimethylaminopropyl)-3-hydroxyphthalane the hydrochlorides of 1,1 - dimethyl-3-(3-diethylaminopropyl)-3-cyano-phthalane and 1,1-dimethyl-3 - (3 - di - n - butylaminopropyl) - 3 - cyano - phthalane were obtained respectively.

Example 17.—1,1-dimethyl-3-(3-dimethylamino-isobutyl)-3-cyano-phthalane and its hydrochloride When Example 1 was carried out using the equivalent amount of 1,1 - dimethyl - 3 - (3 - dimethylamino-isobutyl) - 3 - hydroxy - phthalane instead of 1,1-dimethyl-3-(3 - dimethylaminopropyl) - 3 - hydroxy - phthalane the hydrochloride of 1,1 - dimethyl - 3 - (3 - dimethylamino-iso-butyl) - 3 - cyano-phthalane was obtained as a white crystalline substance.

Example 18.—1,1 - dimethyl-3-(3-dimethylaminopropyl)-3-cyano - 5 - trifluoromethyl-phthalane and its hydrochloride When Example 1 was carried out using the equivalent amount of 1,1 - dimethyl - 3 - (3-dimethylamino-propyl)-3 - hydroxy - 5 - trifluoromethyl - phthalane instead of 1,1 - dimethyl - 3 - (3 - dimethylaminopropyl)-3-hydroxyphthalane the hydrochloride of 1,1-dimethyl - 3 - (3-dimethylaminopropyl) - 3 - cyano - 5 - trifluoromethyl-phthalane was obtained.

Example 19.—1,1-dimethyl-3-(3-dimethylaminopropyl)-3-cyano-5-chloro-phthalane and its hydrochloride When Example 1 was carried out using the equivalent amount of 1,1-dimethyl - 3 - (3-dimethyl-aminopropyl)-3 - hydroxy - 5 - chloro - phthalane instead of 1,1 - dimethyl - 3 - (3 - dimethylaminopropyl) - 3 - hydroxyphthalane the hydrochloride of 1,1 - dimethyl - 3 - (3-dimethylaminopropyl) - 3 - cyano - 5 - chloro - phthalane was obtained.

Example 20.—1,1 - dimethyl - 3 - (3 - dimethylaminopropyl) - 3 - carbomethoxy - phthalane and its hydrochloride When Example 8 was carried out using methanol instead of ethanol the hydrochloride of 1,1 - dimethyl-3-(3 - dimethylaminopropyl) - 3 - carbomethoxy-phthalane was obtained as a white crystalline substance melting at 169–170 degrees centigrade.

Example 21.—1,1 - dimethyl - 3 - (3 - dimethylaminopropyl) - 3 - cyano - 5 - methoxy - phthalane and its hydrochloride When Example 1 was carried out using the equivalent amount of 1,1 - dimethyl - 3 - (3-dimethylaminopropyl)-3 - hydroxy - 5 - methoxy - phthalane instead of 1,1-dimethyl - 3 - (3 - dimethyl - aminopropyl) - 3 - hydroxyphthalane the hydrochloride of 1,1 - dimethyl - 3 - (3-dimethylaminopropyl) - 3 - cyano - 5 - methoxy-phthalane was obtained melting at 157–159 degrees centigrade of recrystallization from acetone.

Example 22.—1,1-dimethyl-3-(3-dimethylaminopropyl)-3-isobutyryl-phthalane and its hydrochloride When Example 2 was carried out using the equivalent amount of iso-propyl magnesium bromide instead of ethylmagnesiumbromide the hydrochloride of 1,1 - dimethyl-3 - (3 - dimethylaminopropyl) - 3 - isobutyryl-phthalane was obtained as white crystals which melt at 187–189 degrees centigrade.

Example 23.—1,1-dimethyl-3-(3-dimethylaminopropyl)-3-phenacetyl-phthalane and its hydrochloride When Example 2 was carried out using the equivalent amount of benzylmagnesium chloride instead of ethylmagnesium bromide 1,1-dimethyl-3 - (3 - dimethylaminopropyl)-3-phenacetyl-phthalane was obtained as a yellow oil boiling at 166–168 degrees centigrade/0.4 mm. Hg.

The hydrochloride was obtained by crystallization from acetone and melts at 158–160 degrees centigrade.

Example 24.—1,1-dimethyl-3-(3-dimethylaminopropyl)-phthalane-carboxanilide-3 and its oxalate 12 grams of aniline dissolved in 75 milliliters of dry ether were added dropwise to a solution of methyl-magnesium iodide prepared from 22 grams of methyliodide and 4 grams magnesium in 100 milliliters of dry ether, whereupon the mixture was heated on a steambath for ten minutes under reflux. The 19 grams of 1,1-dimethyl-3-(3-dimethylaminopropyl)-3-carbethoxy - phthalane dissolved in 40 milliliters of dry ether were added dropwise and the reaction mixture heated for two hours on a steam bath with reflux. The mixture was poured unto ice, made acid with dilute hydrochloric acid, the ether phase separated and the aqueous phase made alkaline with aqueous ammonia. The oil which separated out was extracted with ether, the ether phase dried over anhydrous potassium carbonate and evaporated at last in vacuum in order to remove excess aniline. The residue was dissolved in acetone and neutralized to pH 5 with a solution of oxalic acid in acetone. Thereby 6 grams of the oxalate of 1,1-dimethyl - 3 - (3 - dimethylaminopropyl)-phthalane-carboxanilide-3 were obtained as white crystals which after recrystallization from chloroform melts at 136–138 degrees centigrade.

Example 25.—1-methyl-1-phenyl-3-(3-dimethylaminopropyl)-3-cyanophthalane and its hydrochloride When Example 1 was carried out using 1-methyl-1-phenyl-3-(3-dimethylaminopropyl)-3-hydroxy - phthalane instead of 1,1-dimethyl-3-(3 - dimethylaminopropyl) - 3-hydroxy-phthalane the hydrochloride of 1 - methyl - 1-phenyl-3-(3-dimethylaminopropyl) - 3 - cyano - phthalane was obtained as a white crystalline substance which after recrystallization from acetone melts at 210 degrees centigrade.

Example 26.—1,1-dimethyl-3-(3-dimethylaminopropyl)-phthalane-carboxaldehyde-3

To a solution of 26 grams of 1,1-dimethyl-3-(3-dimethylaminopropyl)-3-cyano-phthalane in 300 milliliters of dry ether was added slowly and while stirring and cooling 1.5 grams of lithium aluminum hydride, and the resulting mixture heated on a steam bath for 30 minutes under reflux. Then water was added cautiously in sufficient amount to enable the ether phase to be decanted from the hydroxides of lithium and aluminum. The ether phase was evaporated and the crude 1,1-dimethyl-3-(3-dimethylaminopropyl)-phthalane-carboxaldehyde-3 obtained as a yellow oil. The hydrochloride was obtained as a white crystalline substance from acetone and melts at 187–189 degrees centigrade.

Example 27.—1,1-dimethyl-3-(3-dimethylaminopropyl)-phthalane-carboxaldoxime-3 and its hydrochloride A mixture of 15 grams of 1,1-dimethyl-3-(3-dimethylaminopropyl)-phthalane-carboxaldehyde-3, 6 grams of hydroxylamine hydrochloride, 20 milliliters of ethanol and 5 grams of sodium hydroxide was boiled for 5 minutes under reflux. The ethanol was evaporated in vacuum, the residue dissolved in water and extracted with ether. The ether phase was dried and evaporated, whereby 1,1-dimethyl-3-(3-dimethylaminopropyl) - phthalane - carboxaldoxime-3 was obtained as an oil. The hydrochloride crystallizes from acetone and melts at 192–193 degrees centigrade.

Example 28.—1,1-dimethyl-3-(3-dimethylaminopropyl)-3-aminomethyl-phthalane and its dihydrochloride To a solution of 4 grams of lithium aluminum hydride in 50 milliliters of ether was added dropwise and under reflux a solution of 20 grams of 1,1-dimethyl-3-(3-dimethylaminopropyl)-3-cyanophthalane in 50 milliliters of ether, whereupon the mixture was heated on a steam bath for one hour under reflux. The 1,1-dimethyl-3-(3-dimethylaminopropyl)-3-aminomethyl-phthalane obtained was isolated as described in Example 27. The dihydrochloride was obtained from acetone and melts at 230–231 degrees centigrade.

Example 29.—1,1-dimethyl-3-(3-aminopropyl)-3-cyanophthalane and its hydrochloride When Example 10 was carried out using the equivalent amount of 3-aminopropylchloride instead of 2-dimethylaminoethylchloride 1,1-dimethyl-3 - (3 - aminopropyl)-3-cyano-phthalane was obtained as a yellow oil. The hydrochloride was obtained by crystallization from ethanol and melts at 212–214 degrees centigrade.

The compounds of Formula I and the pharmaceutically acceptable acid addition salts thereof may be administered to animals both orally and parenterally, and may be used for example in the form of tablets, capsules, powders, syrups or in the form of the usual sterile solutions for injection.

Most conveniently the compounds of Formula I are administered orally in unit dosage form such as tablets or capsules, each dosage unit containing the compound or preferably as a suitable acid addition salt of one of the said compounds in an amount of from about 0.1 to about 50 mg., most preferably, however, from about 0.5–25 mg., calculated as the free amine, the total daily dosage usually ranging from about 0.5 to about 300 mg. The exact individual dosages as well as daily dosages in a particular case will, of course, be determined according to established therapeutic principles.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 10 mg. of 1,1-dimethyl-3-(3-methylaminopropyl)-3-cyano-phthalane (called Lu 4–012 for short) in the form of its hydrochloride is a follows:

| | Mg. |
|---|---|
| Lu 4–012, hydrochloride | 11.2 |
| Potato starch | 36 |
| Lactose | 18 |
| Gelatine | 5 |
| Talcum | 6 |
| Magnesium stearate | 0.4 |

Any other pharmaceutical tableting adjuvants may be used provided that they are compatible with the active ingredient, and additional compositions and dosage forms, may be similar to those presently used for thymoleptics such as imipramine, amitriptyline or nortriptyline. Also combination of the compounds of Formula I as well as their pharmaceutically acceptable acid salts with other active ingredients especially other thymoleptics, neuroleptics or the like fall within the scope of the present invention.

As previously stated, when isolating the compounds of Formula I in the form of an acid addition salt, the acid is preferably selected so as to contain an anion which is pharmacologically acceptable, at least in usual therapeutic doses. Representative salts which are included in this preferred group are the hydrochlorides, hydrobromides, sulphates, acetates, phosphates, nitrates, methanesulphonates, ethanesulphonates, lactates, citrates, tartrates or bitartrates, and maleates of the amines of Formula I. Other acids are likewise suitable and may be employed if desired. For example, fumaric, benzoic, ascorbic, succinic, salicylic, bismethylenesalicylic, propionic, gluconic, malic, malonic, mandelic, cinnamic, citraconic, stearic, palmitic, itaconic, glycolic, benzenesulphonic, and sulphamic acids may also be employed as acid addition salt forming acids. When it is desired to isolate a compound of the invention in the form of the free base, this may be done according to conventional procedure, as by dissolving the isolated or unisolated salt in water, treating with a suitable alkaline material, extracting the liberated free base with a suitable organic solvent, drying the liberated free base with a suitable organic solvent, drying the extract and evaporating to dryness or fractionally distilling to effect isolation of the free basic amine.

It is to be understood that the invention is not limited to the exact details of operation or exact compound or compositions shown and described, as obvious modifications and equivalents will be apparent to one skilled in the art.

We claim:

1. A pharmaceutical composition in unit dosage form suitable for use in the treatment of endogenous depression comprising a pharmaceutical carrier and a pharmaceutically effective dose of an amino-alkyl-substituted phthalane selected from the group consisting of (a) a compound of the formula:

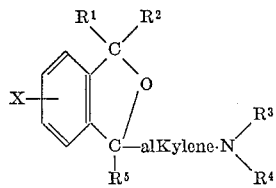

wherein $R^1$ and $R^2$ each is selected from the group consisting of hydrogen, a lower-alkyl, and phenyl, $R^3$ and $R^4$ are selected from the group consisting of hydrogen, lower-alkyl, and benzyl, "alkylene" represents a straight or branched alkylene chain having 2-6 carbon atoms, at least two carbon atoms being in the chain directly connecting the ring carbon atom with the nitrogen atom, X is a five (5) position substituent selected from the group consisting of hydrogen, halogen, lower-alkyl, lower-alkyloxy and trihalomethyl, and $R^5$ is selected from the group consisting of —CN, —CHO, —C=N·OH, —COOH, —CH$_2$·NH$_2$, —CO·NHR$^6$, —COOR$^7$, —CO·R$^8$ and —CHOH·R$^8$ wherein $R^6$ is selected from the group consisting of hydrogen, lower-alkyl, and phenyl group, $R^7$ represents lower-alkyl, and $R^8$ is selected from the group consisting of lower-alkyl, phenyl, and phenyl-lower-alkyl, and (b) an acid addition salt thereof with a pharmaceutically acceptable acid.

2. A pharmaceutical composition in unit dosage form comprising a pharmaceutical carrier and a pharmaceutically effective dose of an amino-alkyl-substituted phthalane in accordance with claim 1 characterized in that $R^1$ and $R^2$ each represent lower-alkyl, $R^3$ is hydrogen and $R^4$ is lower-alkyl, "alkylene" represents a straight or branched alkylene chain having 2-6 carbon atoms, at least two carbon atoms being in the chain directly connecting the ring carbon with the nitrogen atom, X represents hydrogen, and $R^5$ represents —CN.

3. A pharmaceutical composition in unit dosage form comprising a pharmaceutical carrier and the pharmaceutically effective dose of an amino-alkyl-substituted phthalane in accordance with claim 1 characterized in that $R^1$ and $R^2$ each represent lower-alkyl, $R^3$ and $R^4$ are both lower-alkyl, "alkylene" represents a straight or branched alkylene chain having 2-6 carbon atoms, at least two carbon atoms being in the chain directly connecting the ring carbon atom with the nitrogen atom, X represents hydrogen and $R^5$ represents —CN.

4. A pharmaceutical composition in unit dosage form comprising a pharmaceutical carrier and a pharmaceutically effective dose of an amino-alkyl-substituted phthalane in accordance with claim 1 characterized in that $R^1$ and $R^2$ each represent lower-alkyl, $R^3$ is hydrogen and $R^4$ is lower-alkyl, "alkylene" represents a straight or branched alkylene chain having 2-6 carbon atoms, at least two carbon atoms being in the chain directly connecting the ring carbon atom with the nitrogen atom, X represents hydrogen and $R^5$ represents CO·NH·phenyl.

5. A pharmaceutical composition in unit dosage form comprising a pharmaceutical carrier and a pharmaceutically effective dose of an amino-alkyl-substituted phthalane in accordance with claim 1, characterized in that $R^1$ and $R^2$ each represent lower-alkyl, $R^3$ and $R^4$ are both lower-alkyl, "alkylene" represents a straight or branched alkylene chain having 2-6 carbon atoms, at least two carbon atoms being in the chain directly connecting the ring carbon atom with the nitrogen atom, X represents hydrogen and $R^5$ represents —CO·NH·phenyl.

6. A pharmaceutical composition in unit dosage form comprising a pharmaceutical carrier and a pharmaceutically effective dose of an amino-alkyl-substituted phthalane in accordance with claim 1, characterized in that $R^1$ and $R^2$ each is lower-alkyl with 1-3 carbon atoms, $R^3$ is hydrogen and $R^4$ is methyl, "alkylene" is —CH$_2$·CH$_2$·CH$_2$—, X is hydrogen and $R^5$ is —CN.

7. A pharmaceutical composition in unit dosage form comprising a pharmaceutical carrier and a pharmaceutically effective dose of an amino-alkyl-substituted phthalane in accordance with claim 1, characterized in that $R^1$ and $R^2$ each is a lower-alkyl with 1-3 carbon atoms, $R^3$ is hydrogen, $R^4$ is methyl, "alkylene" is —CH$_2$·CH$_2$·CH$_2$—, X is hydrogen and $R^5$ is —CO·NH·phenyl.

8. A pharmaceutical composition in unit dosage form comprising a pharmaceutical carrier and a pharmaceutically effective dose of an amino-alkyl-substituted phthalane in accordance with claim 1, characterized in that $R^1$ and $R^2$ each is lower-alkyl with 1-3 carbon atoms, $R^3$ and $R^4$ is each methyl, "alkylene" is —CH$_2$·CH$_2$·CH$_2$—, X is hydrogen and $R^5$ is —CO·NH·phenyl.

9. A composition according to claim 1, wherein the active ingredient is present in an amount of from 0.1 to 50 milligrams per unit dose, calculated as the free amine.

10. A composition according to claim 1, wherein the active ingredient is a pharmaceutically acceptable acid addition salt of 1,1 - dimethyl - 3 - (3 - dimethylaminopropyl)-3-cyano-phthalane.

11. A composition according to claim 1, wherein the active ingredient is a pharmaceutically acceptable acid addition salt of 1,1 - dimethyl - 3 - (3 - methylaminopropyl)-3-cyano-phthalane.

12. A composition according to claim 1, wherein the active ingredient is a pharmaceutically acceptable acid addition salt of 1,1 - dimethyl - 3 - (3 - dimethylaminopropyl)-phthalane-carboxanilide-3.

13. A composition according to claim 1 wherein the active ingredient is a pharmaceutically acceptable acid addition salt of 1,1 - dimethyl - 3 - (3 - methylaminopropyl)-phthalane-carboxanilide-3.

14. A method of treating endogenous depression which comprises administering to a mammal a therapeutically effective dose of an anti-depressant which is an amino-alkyl-substituted phthalane selected from the group consisting of (a) compounds of the formula:

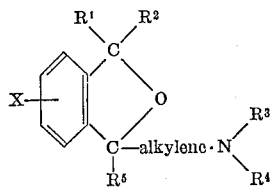

wherein $R^1$ and $R^2$ each is selected from the group consisting of hydrogen, a lower-alkyl, and phenyl, $R^3$ and $R^4$ are selected from the group consisting of hydrogen, lower-alkyl, and benzyl, "alkylene" represents a straight or branched alkylene chain having a 2–6 carbon atoms, at least two carbon atoms being in the chain directly connecting the ring carbon atom with the nitrogen atom, X is a five (5) position substituent selected from the group consisting of hydrogen, halogen, lower-alkyl, lower-alkyloxy and trihalomethyl, and $R^5$ is selected from the group consisting of

and

wherein $R^6$ is selected from the group consisting of hydrogen, lower-alkyl, and phenyl group, $R^7$ represents lower-alkyl, and $R^8$ is selected from the group consisting of lower-alkyl, phenyl, and phenyl-lower-alkyl, and (b) an acid addition salt thereof with a pharmaceutically acceptable acid.

15. A method of treating endogenous depression according to claim 14 which comprises administering an effective quantity in the range from about 0.1 to about 50 milligrams of the antidepressant compound, calculated as the free amine.

16. A method of treating endogenous depression according to claim 14 which comprises administering an effective quantity in the range from about 0.5 to about 25 milligrams of the antidepressant compound, calculated as the free amine.

17. A method according to claim 14 wherein the antidepressant is 1,1 - dimethyl - 3 - (3 - dimethylaminopropyl) - 3 - cyano-phthalane or a pharmaceutically acceptable acid addition salt thereof.

18. A method according to claim 14 wherein the antidepressant is 1,1 - dimethyl - 3 - (3 - methylaminopropyl) - 3 - cyano-phthalane or a pharmaceutically acceptable acid addition salt thereof.

19. A method according to claim 14 wherein the antidepressant is 1,1 - dimethyl - 3 - (3 - dimethylaminopropyl)-phthalane-carboxanilide - 3 or a pharmaceutically acceptable acid addition salt thereof.

20. A method according to claim 14 wherein the antidepressant is 1,1 - dimethyl - 3 - (3 - methylaminopropyl)-phthalane-carboxanilide - 3 or a pharmaceutically acceptable acid addition salt thereof.

References Cited

Petersen et al.: Chem. Abst., vol. 65, p. 17531 (1966).

STANLEY J. FRIEDMAN, Primary Examiner

UNITED STATES PATENT OFFICE
CERTIFICATE OF CORRECTION

Patent No. 3,629,444          Dated 21 December 1971

Inventor(s) Povl V. Petersen et al.

It is certified that error appears in the above-identified patent and that said Letters Patent are hereby corrected as shown below:

Col. 3, line 54          "acetic acid tartaric acid"
Page 5, line 6           -- acetic acid, tartaric acid --

Col. 4, line 28          "butyllihium"
Page 6, line 15          -- butyllithium --

Col. 5, lines 8-9        "1,1-dimethyl-(3-dimethylamino-
Page 7, line 24              propyl)..."
                         -- 1,1-dimethyl-3-(3-dimethylamino-
                             propyl)... --

Col. 5, line 46          "(67)"
Page 8, line 21          -- (67%) --

Col. 6, line 15          "hydrochlorine"
Page 9, line 25          -- hydrochloride --

Col. 7, line 19          "is"
Page 11, line 25         -- in --

Col. 11, line 42 (Claim 1,   "...alKylene..."
    formula)             -- ...alkylene... --
Page 20, Claim 1 (formula)

Signed and sealed this 6th day of June 1972.

(SEAL)
Attest:

EDWARD M. FLETCHER, JR.          ROBERT GOTTSCHALK
Attesting Officer                Commissioner of Patents